US006791991B1

(12) United States Patent
Mobin et al.

(10) Patent No.: US 6,791,991 B1
(45) Date of Patent: Sep. 14, 2004

(54) CHANNEL SEQUENCING USING A ROUND-ROBIN SCHEDULER

(75) Inventors: Mohammad S. Mobin, Whitehall, PA (US); Kalyan Mondal, Berkeley Heights, NJ (US); Himanshu M. Thaker, Summit, NJ (US)

(73) Assignee: Agere Systems Inc., Allentown, PA (US)

( * ) Notice: Subject to any disclaimer, the term of this patent is extended or adjusted under 35 U.S.C. 154(b) by 696 days.

(21) Appl. No.: 09/702,366

(22) Filed: Oct. 31, 2000

(51) Int. Cl.[7] .................................................. H04J 3/17
(52) U.S. Cl. ........................................ 370/412; 370/459
(58) Field of Search ................................. 370/345–348, 370/412, 433–434, 458–459, 537, 540, 395.4, 395.41

(56) References Cited

U.S. PATENT DOCUMENTS

| | | | | |
|---|---|---|---|---|
| 5,392,280 A | * | 2/1995 | Zheng | 370/353 |
| 5,838,686 A | * | 11/1998 | Ozkan | 370/433 |
| 6,185,221 B1 | * | 2/2001 | Aybay | 370/412 |
| 6,188,699 B1 | * | 2/2001 | Lang et al. | 370/463 |
| 6,233,258 B1 | * | 5/2001 | Kanehara | 370/537 |
| 6,327,275 B1 | * | 12/2001 | Gardner et al. | 370/535 |
| 6,396,853 B1 | * | 5/2002 | Humphrey et al. | 370/535 |
| 6,470,017 B1 | * | 10/2002 | Otaka et al. | 370/395.71 |
| 6,498,798 B1 | * | 12/2002 | Krishnamoorthy et al. | 370/537 |
| 6,504,855 B1 | * | 1/2003 | Matsunaga | 370/537 |
| 6,516,002 B1 | * | 2/2003 | Huang et al. | 370/468 |

* cited by examiner

Primary Examiner—Hassan Kizou
Assistant Examiner—Gregory Sefcheck

(57) ABSTRACT

A terminal receives one or more input frames comprising one or more logical channels and may generate one or more output frames including the data received in the logical channels. Each logical channel is dispersed throughout the input frame in one or more timeslots, and each logical channel has an associated buffer. The data of each logical channel received from the timeslot(s) of the input frame(s) is stored in the corresponding buffer. The terminal uses channel sequencing for round-robin scheduling to transfer the data of the received logical channels, if present, in each buffer to one or more output frames. Channel sequencing may apply round-robin scheduling of service of buffers in ascending or descending order of non-empty buffers, accounting for newly filled buffers. Channel sequencing generates a binary word, termed a channels service request (CSR) word, with each bit of the CSR word corresponding to a buffer and indicating whether the buffer requests service. When at least one bit of the CSR word is set, a cycle of round-robin scheduling begins. During a cycle, logic combines the CSR word with a mask to form a masked CSR word, and the mask resets those bits of the CSR word that correspond to newly filled buffers that should be served during the next cycle. The masked CSR word identifies the next, non-empty buffer to be serviced by the buffer server, and the mask generator employs either the CSR word at the beginning of the cycle or the current masked CSR word during the cycle to generate the next mask.

14 Claims, 5 Drawing Sheets

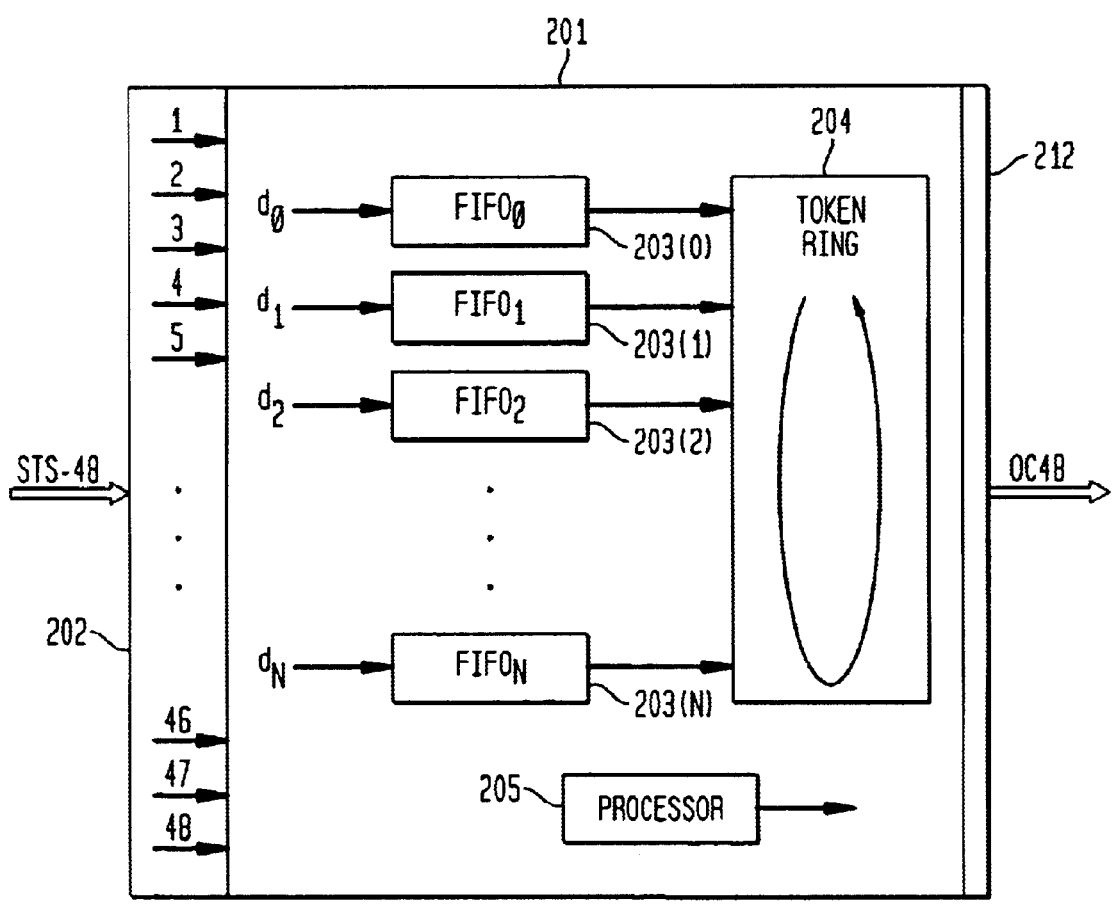

CHANNEL SEQUENCING USING A ROUND-ROBIN SCHEDULER

BACKGROUND OF THE INVENTION

1. Field of the Invention

The present invention relates to data transfer within logical channels by a node in a telecommunications system, and, in particular, generating a sequence of logical channels for service by the node.

2. Description of the Related Art

Telecommunication systems typically employ a multiplexing hierarchy to integrate multiple user data channels for transmission through a medium. Transmission through the medium at one level of the hierarchy is generally at a much higher rate than the rate of each user's data at a lower level of the hierarchy. For synchronous networks, the methods employed for multiplexing may use a frame format in which data of individual user channels are inserted into predefined "timeslots" within a frame. Some networks have rather rigid provisioning for channel-timeslot allocation, such as time-division multiplexing, while others, such as synchronous packet (cell) networks, may allocate channels within the various timeslots with greater flexibility. Each frame at one level may be inserted into one or more timeslots of a frame of the next, higher level of the hierarchy, thus preserving the framing and other format information of the lower level. Alternatively, a frame at the lower level may be de-multiplexed and the user channels of its timeslots then re-multiplexed into the frame at the higher level.

Many standards exist that define such multiplexing hierarchies. For example, the Synchronous Digital Hierarchy (SDH) and the Synchronous Optical Network (SONET) models are employed for optical transmission systems. In SONET, the basic frame is a synchronous transport signal at level 1 (STS-1) that comprises 810 octets of data (27 octets overhead and 783 octets payload). Higher levels (STS-n) are formed from predefined multiples of n times the basic STS-1 frame. In general, SONET frames map directly to optical carrier (OC) line signals used for physical transmission through a line (i.e., STS-1 maps directly to OC-1, STS-48 maps directly to OC-48, etc.) Similarly, in SDH the basic frame is a synchronous transmission module at level 1 (STM-1) that comprises 2430 octets of data (81 octets overhead and 2349 octets payload). Higher levels (STM-n) are formed from predefined multiples of n times the basic STM-1 frame. Many standards are related. For example, the STM-1 frame may be formed from 3 STS-1 frames. Thus, a certain SDH level may be mapped to a corresponding STS level, such as STM-1 mapped directly to STS-3 and STM-16 mapped directly to STS-48. However, only predefined multiples are allowed by the standards.

FIG. 1 illustrates a transmission format of a prior art data frame for STS-48 (or OC-48) payload that may be employed for multiplexing several channels within a sequence of timeslots. As illustrated in FIG. 1, the payload is organized into four rows of 12 timeslots. Also shown in FIG. 1, each user data stream (e.g., $d_0$ and $d_1$, sometimes referred to as "logical channels") may occupy several different timeslots within a given frame. A payload mark may be included within the frame and may be used to identify whether the bits within a frame are valid information or are blank/unused/undefined bits. External header or other control information may be used to identify user or other provisioning information.

A user's communication path through a network comprises those nodes and links through which the user data stream traverses. Nodes may contain switching, multiplexing/demultiplexing, and/or other line terminal equipment; and links may be those physical lines or media that connect the equipment. Once provisioned through the network, a logical channel through the path may be identified at any given time by the timeslot position(s) within a frame at each level. At any given node of a network through which the user communication path traverses, several processing functions may be applied to a link carrying the user's logical channel. These processing functions may be employed for switching and cross-connect (e.g., cell-relay) operations, or may be employed for re-formatting operations (e.g., convert between DS-3, SONET, SDH, and UTOPIA frame formats).

Three common processing functions are drop-add, cross-connect, and rearrangement/packing. For drop-add, a logical channel is either "dropped" or "added" to a frame. A drop may be for local reception from frames of one line input to (output from) the node. An add may be for local transmission to frames of one line output from the node. For cross-connect, a logical channel is transferred between timeslots of two or more different frames and/or lines passing through the node. For packing, the positions of timeslots allocated to user data of a logical channel are rearranged. Packing may be employed when a logical channel occupies several timeslots in positions disbursed through a frame, and rearrangement may allow for contiguous timeslots throughout the frame.

Terminal or other transmission equipment generally includes an interface to receive, buffer, and output logical channels of an input line with a given line format (hierarchical-level frame format). FIG. 2 shows a block diagram of a prior art terminal 201 that receives, buffers and outputs data of logical channels for the sequence of timeslots for the frame format shown in FIG. 1. The interface 201 includes input line termination 202, first-in, first-out (FIFO) buffers 203(0)–203(N), token ring 204, output line termination 212, and processor 205. Processor 205 may be used to coordinate or otherwise control operation of the various elements within terminal 201. Line termination 202 separates, for example, the 48 separate timeslots of the STS-48 frame while also removing header and frame format information that may be provided to processor 205. Each of N+1 logical channels is assigned to a corresponding one of the FIFO buffers 203(0)–203(N). Data for each of the N+1 logical channels that is received by input line termination 202 in one or more of the 48 timeslots is transferred to a corresponding one of the FIFO buffers 203(0)–203(N).

To generate an output OC-48 line optical signal from output line termination 212, data of each logical channel that is buffered in FIFO buffers 203(0)–203(N) is read out into one or more timeslots of the OC-48 frame that is generated by output line termination 212. Token ring 204 services, in sequence, each of the FIFO buffers 203(0)–203(N) (and hence, the sequence of logical channels) by examining the buffer to see if it is empty, processes non-empty buffers until a specified event is detected, and then examines the next buffer in the sequence. The sequence is considered "token ring" (also referred to as "round-robin") scheduling since token ring 204 processes buffers in ascending or descending order, and returns to the first buffer in the sequence after the last buffer in the sequence is served. As each one of the non-empty FIFO buffers 203(0)–203(N) is served, data in the serviced buffer is inserted into the timeslot(s) of the output frame until either of two types of events first occurs. The first type of event occurs when the currently serviced FIFO buffer becomes empty. The second type of event is that a timer (not shown) generates an interrupt causing the token ring 204 to advance to the next FIFO buffer in the sequence. Timer-generated interrupts may be used to introduce "fairness" to service of buffers. In either case, however, FIFO buffers 203(0)–203(N) may or may not have buffered data.

Token rings of the prior art step through each logical channel to examine each corresponding buffer before determining whether the buffer needs service, wasting processing cycles. In addition, implementations of token rings of the prior art may not be robust to corruption of the token. Consequently, the token may be "lost", causing the scheduler to fail. To correct this, some implementations of the prior art may include additional circuitry or logic to prevent circuit failure from corruption of the token.

SUMMARY OF THE INVENTION

The present invention relates to channel sequencing for round-robin scheduling of service for buffers associated with logical channels to transfer data, if present, in each buffer to one or more output frames while avoiding empty buffers. Channel sequencing generates a (N+1)-bit binary word, termed a channel service request (CSR) word, with each bit of the CSR word corresponding to one of (N+1) buffers and indicating whether the buffer contains data and requests service. Channel sequencing for round-robin scheduling identifies buffers for service in ascending or descending order of non-empty buffers, accounting for CSR bits set for newly filled buffers with a mask. A cycle of the round-robin scheduling begins when a CSR word is generated having at least one bit set, indicating that at least one logical channel buffer requests service. For each subsequently generated CSR word, the CSR word is combined with a mask to form a masked CSR word. The mask resets those bits of the CSR word that represent newly filled buffers for logical channels whose service is scheduled for the next cycle of round-robin scheduling. The first set of bits of the masked CSR word identifies the next, non-empty buffer for service. The mask generator employs the current masked CSR word to generate the next mask when service of the current logical channel service request completes. The cycle ends when service of the buffer corresponding to the final logical channel service request is complete, at which point round-robin scheduling rolls over to the beginning of the next cycle with the current CSR word.

In accordance with embodiments of the present invention, data is routed from an input frame to an output frame with a scheduler that implements round-robin channel sequencing based on a logical channel order. Data is received in a plurality of buffers, each buffer associated with a logical channel and receiving data for the corresponding logical channel in the input frame, wherein, when the one or more of the plurality of buffers are serviced, the data from the one or more buffers is transferred in accordance with a logical channel order for inclusion in the output frame. A channel service request (CSR) word is generated from the plurality of buffers, each bit of the CSR word associated with a channel to identify each corresponding non-empty buffer. The scheduler 1) generates a mask related to a token for round-robin scheduling; 2) generates the logical channel order from the channel service data in accordance with the round-robin scheduling; and 3) updates the logical channel order and mask during a cycle. The scheduler generates the logical channel order to select channels with non-empty buffers for service during each cycle of round-robin scheduling, and updates the mask to maintain the token.

BRIEF DESCRIPTION OF THE DRAWINGS

Other aspects, features, and advantages of the present invention will become more fully apparent from the following detailed description, the appended claims, and the accompanying drawings in which:

FIG. 1 illustrates a transmission format of a prior art data frame that may be employed for multiplexing several channels within a sequence of timeslots;

FIG. 2 shows a block diagram of a prior art terminal that reformats the sequence of timeslots for each logical channel in an input frame to generate an output frame;

DETAILED DESCRIPTION

In accordance with exemplary embodiments of the present invention, a terminal receives one or more input frames. Each frame comprises a set of timeslots containing data of one or more logical channels, and the terminal may generate one or more output frames including the data received in the logical channels. Each logical channel is dispersed throughout the input frame in one or more timeslots, and each logical channel has a corresponding buffer. The data of each logical channel received from the timeslot(s) of the input frame(s) are stored in the corresponding buffer. The terminal uses channel sequencing for round-robin scheduling to transfer the data of the received logical channels, if present, in each buffer to one or more output frames while avoiding operations for empty buffers. Round-robin scheduling generates a word representing non-empty buffers, a token that is employed as a mask, a masked word by applying the mask to the word, and an enabling signal. The enabling signal is employed to select either the word or the masked word to identify the current logical channel and corresponding buffer for service. Implementations of the present invention may be robust to corruption of the token, since each service and each cycle re-generates a valid token.

While exemplary embodiments of the present invention are described with respect to a terminal that receives and generates signals and frames formatted in accordance with SONET, SDH, ATM (asynchronous transfer mode), UTOPIA (universal test and operations physical interface for ATM), or similar standards for multiplexing hierarchy, the present invention is not so limited. One skilled in the art would recognize that the present invention may be employed for terminals rearranging timeslots between signals formatted in accordance with other multiplexing hierarchies, such as between timeslots of input and output frames formatted with the digital signal n (DS-n) standard. The present invention may be employed in any scheme in which round-robin addressing of non-empty storage modules for subsequent processing is employed. For example, such round-robin addressing may be employed in buffers storing and processing data of logical channels in frame-relay, cell-relay, or virtual-circuit systems. In addition, while the present invention is described for a single input OC-48 frame and generating a single output OC-48 frame, the present invention is not so limited. The present invention may be employed with any system in which an input frame of several channels (e.g., SDH-1 or STS-12 frames) is buffered and the channels are output in one or more frames of a different format (e.g, OC-48 or UTOPIA-48).

Figure 3:
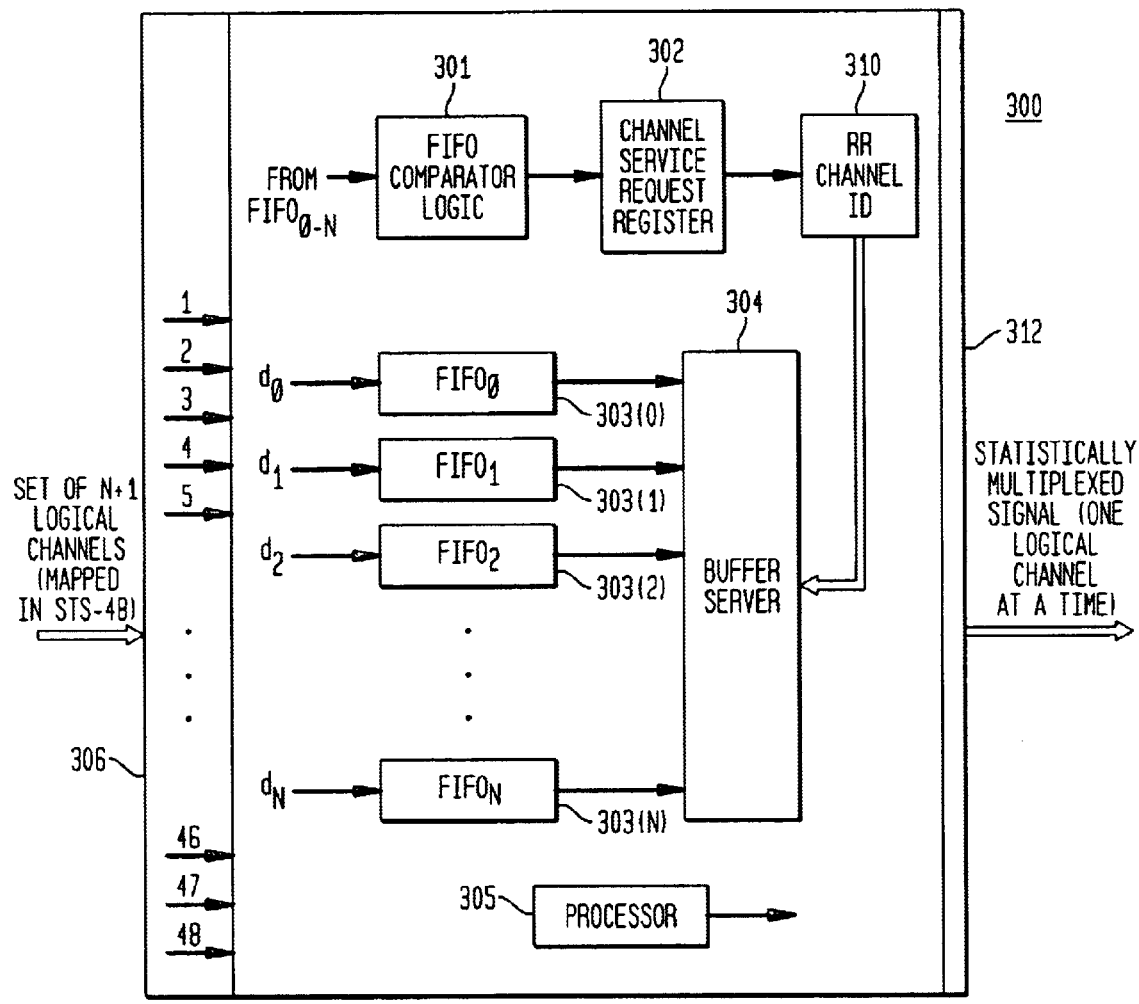
FIG. 3 shows a block diagram of a terminal including channel sequencing for round-robin scheduling in accordance with an exemplary embodiment of the present invention.

FIG. 3 shows a block diagram of a terminal 300 implementing channel sequencing for round-robin scheduling in accordance with an exemplary embodiment of the present invention. Terminal 300 receives, buffers, and outputs data of N+1 logical channels for the sequence of timeslots with format such as shown in FIG. 1. A sequence map register may be employed (not shown) to map elements of a logical channel from/to, for example, a SONET timeslot of a line that interfaces with terminal 300. Terminal 300 includes FIFO comparator logic 301, channel service request (CSR) register 302, and round-robin (RR) channel identification (ID) circuit 310. Terminal 300 further includes input line termination 306, first-in, first-out (FIFO) buffers 303(0)–303(N), buffer server 304, output line termination 312, and processor 305.

Processor 305 may be used to coordinate or otherwise control operation of the various elements within terminal 300. Line termination 306 separates, for example, the 48 separate timeslots of the incoming STS-48 frame while also removing header and frame format information that may be provided to processor 305. Each of N+1 logical channels is assigned a corresponding one of the buffers 303(0)–303(N). Data for each of the N+1 logical channels that is received in one or more of the 48 timeslots is transferred to a corresponding one of the buffers 303(0)–303(N).

FIFO comparator logic 301 is coupled to each of the buffers 303(0)–303(N). When one of buffers 303(0)–303(N) is non-empty, and, thus requires service, comparator logic 301 sets a corresponding binary-valued bit. Similarly, when one of buffers 303(0)–303(N) is empty, comparator logic 301 resets the corresponding bit. As used herein, a bit is set when its value transitions to a logic "1",and is reset when the bit's value transitions to logic "0". One skilled in the art would readily recognize that this logic convention is exemplary only, and, for example, opposite logic values may be used for setting and resetting bit values.

Each of the binary-valued bits from FIFO comparator logic 301 is applied to CSR register 302, and CSR register 302 latches the set of bits as a binary word, termed the CSR word. Each bit of the CSR word corresponds to a logical channel in one of the buffers 303(0)–303(N), and each bit of the CSR word identifies whether the buffer of the corresponding logical channel needs service. As used herein, the term "logical channel service request" refers to the buffer corresponding to the logical channel changing from empty to non-empty and the corresponding bit in the CSR word being set. Similarly, "logical channel service" refers to buffer server 304 actively transferring data from a non-empty buffer to the output frame, and "serviced logical channel" refers to termination of service for the buffer corresponding to the logical channel changing and the corresponding bit in the CSR word being reset.

RR Channel ID 310 receives each CSR word when a bit of the CSR word is updated for each logical channel service request or serviced logical channel. RR Channel ID 310 schedules each logical channel service request based on round robin scheduling. Based on the current CSR word, RR Channel ID 310 generates a value, termed the Channel ID, identifying the logical channel whose corresponding one of buffers 303(0)–303(N) is currently due service. Buffer server 304 services the one of buffers 303(0)–303(N) corresponding to the Channel ID by transferring data of the buffer to output line termination 312, which inserts the data into the output statistically multiplexed signal, one channel at a time.

For round robin scheduling in accordance with the exemplary embodiment, each logical channel service request of the non-empty buffers 303(0)–303(N) is scheduled for service in, for example, descending order. The numbers of the descending order may correspond to the logical channel's number (e.g., logical channel 3 is served before logical channel 2, and so on). One skilled in the art would realize that this convention is exemplary and that any scheduling order, such as ascending order, may instead be used. Two cases of round-robin scheduling may exist. For the first case, newly arrived logical channel service requests in which the logical channel's number is lower than the number of the logical channel currently serviced are masked until the next cycle of round-robin scheduling. For the second case, newly arrived logical channels requesting service having a number lower than the number of the currently serviced logical channel are served during the current cycle of round-robin scheduling. In both cases, newly arrived logical channel service requests in which the logical channel's number is higher than the number of the logical channel currently serviced are masked until the next cycle of round-robin scheduling. While techniques of the present invention may be employed for either case, the following describes an exemplary embodiment for the second case, servicing newly-arrived, lower-order logical channel service requests during the current cycle.

For each cycle of round-robin scheduling, a mask is initialized and updated. The mask corresponds to the token of the round-robin (token ring) scheduler. Implementations of the present invention may thus be considered as a priority encoder with either fair or unfair arbitration, depending on how the Mask (token) is to be updated. The implementations generate both a CSR word and an MCSR word, and also generate an enable signal to determine which word is employed to identify the channel currently possessing the token. Corruption of data in either path is accounted for by either the mask update process, the masking process, or the selection process, thus preventing loss of a valid token. Consequently, preventing loss of the token eliminates separate circuitry or correction logic to account for token loss.

Figure 4:
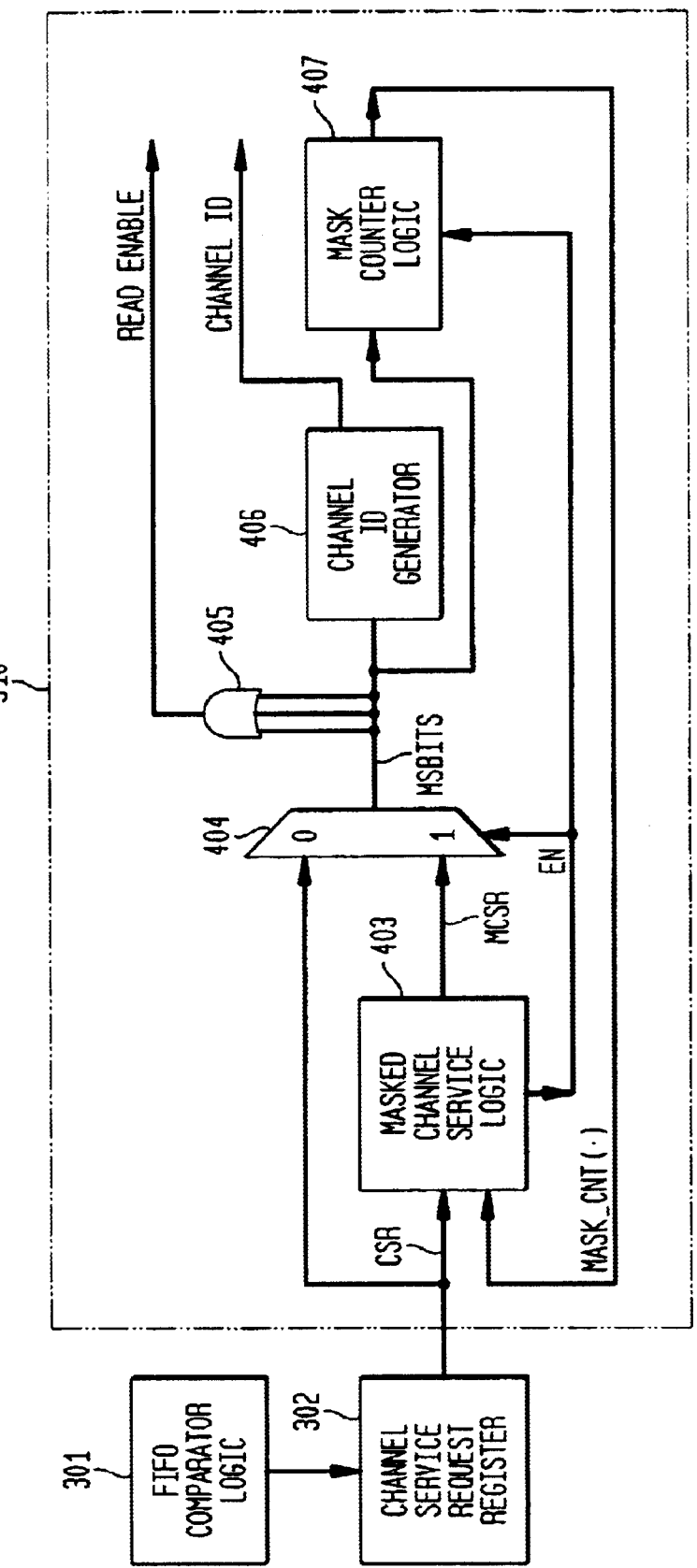
FIG. 4 shows a block diagram for an exemplary implementation of channel sequencing shown in FIG. 3.

FIG. 4 shows an exemplary implementation for RR channel ID circuit 310 shown in FIG. 3. RR channel ID circuit 310 includes masked channel service (MSC) logic 403, multiplexer (mux) 404, OR gate 405, channel ID generator 406, and mask counter logic 407. In accordance with the exemplary embodiment of the present invention, either the CSR word directly or a masked CSR word (MSCR) is provided as the word MSBits that is used by channel ID generator 406 to generate a current value for Channel ID.

Each bit of MSBits is combined in a logic OR operation in OR gate 405 to generate READ ENABLE. When at least one of the bits in MSBits is set, READ ENABLE is set by OR gate 405 to indicate that at least one logical channel service request is present, and thus READ ENABLE may also be used to enable buffer server 304. The bits of the word MSBits are employed by 1) Channel ID generator 406 to identify a logical channel for service in the current cycle of round-robin scheduling, and 2) Mask Counter logic 407 to generate the next mask value (Mask_Cnt) applied to the CSR word during the mask count-down process. The mask resets those bits in the CSR word corresponding to newly-arrived logical channel service requests having a logical channel order higher than the number of the currently serviced logical channel service request.

Mux 404 provides either the CSR word or the MSCR word as the word MSBits based on the value of an enable signal EN generated by MSC logic 403 as described subsequently. The CSR word is provided by mux 404 to the channel ID generator 406 for upon the occurrence of any one of three types of events. The CSR word is provided when 1) no logical channel service request is present (e.g., CSR word bits are all 0's); 2) the first channel service request arrives (i.e., the first time a bit in the CSR word is set) to begin a cycle; and 3) when a mask count-down process reaches a rollover state (described subsequently) to the next cycle. Otherwise, the MCSR word is provided by mux 404 to the channel ID generator 406 during the mask count-down process of a cycle.

For the mask count-down process of a cycle, MCS logic 403 applies Mask_Cnt bit-by-bit to the CSR word received from CSR register 302 to generate the MCSR word. Mask_Cnt is employed to mask certain newly generated channel service requests from the CSR word. Mask Counter logic 407 sets all bits of Mask_Cnt to an initial value at the beginning of a cycle, and the initial value may be set such that the MSB that is set in Mask_Cnt corresponds to the bit of the CSR word that identifies the highest-numbered logical channel requesting service. The remaining least significant bits after the MSB are also set.

Each updated Mask_Cnt is generated by Mask Counter logic 407 using the current value of the MSBits word. Once the mask count-down process starts, the update of Mask_Cnt occurs when a logical channel service is complete. The most significant set bit of Mask_Cnt is reset and the next value for Mask_Cnt has remaining bits set corresponding to logical channel numbers below the number of the serviced current logical channel in the cycle whose completed service initiated (by the updated CSR word) the update of Mask_Cnt. Thus, the sequence of mask values counts down in a logical shift (e.g., logical shift right) process.

When MSC logic 403 applies Mask_Cnt to the CSR word to generate the MCSR word, bits of the CSR word are reset that correspond to channel service requests from logical channels having a number greater than the number of the channel service request currently being serviced by, for example, buffer server 304. MSC logic 403 also generates the enable signal EN indicating whether the bits of the MSCR word are, e.g., all zero, indicating that the mask count-down process is complete and the current cycle of the round-robin scheduling is complete.

As previously described, mux 404 provides either the MCSR or CSR word as MSBits depending on the enable signal EN. Channel ID generator 406 detects the MSB of the MSBits word that is set to identify the highest numbered logical channel service request for the cycle of the round-robin scheduling. Based on the detected MSB of the MSBits word, the channel ID generator 406 provides as an output the identifier for the number of the logical channel (or address of one of the buffers 303(0)–303(N) corresponding to the number of the logical channel) for service by buffer server 304.

The following describes an exemplary implementation for the described embodiment in which four logical channels are provisioned and round-robin scheduling in descending order of logical channel number is employed. Consequently, four FIFO buffers (FIFO(0)–FIFO(3)) are assigned, one per logical channel (Channel IDs 0–3), and data of the 48 input timeslots are allocated to the corresponding FIFO buffers as received. One skilled in the art would recognize that the present invention is not limited to four logical channels and the described implementations may be adapted to various logical channel configurations.

Figure 5:
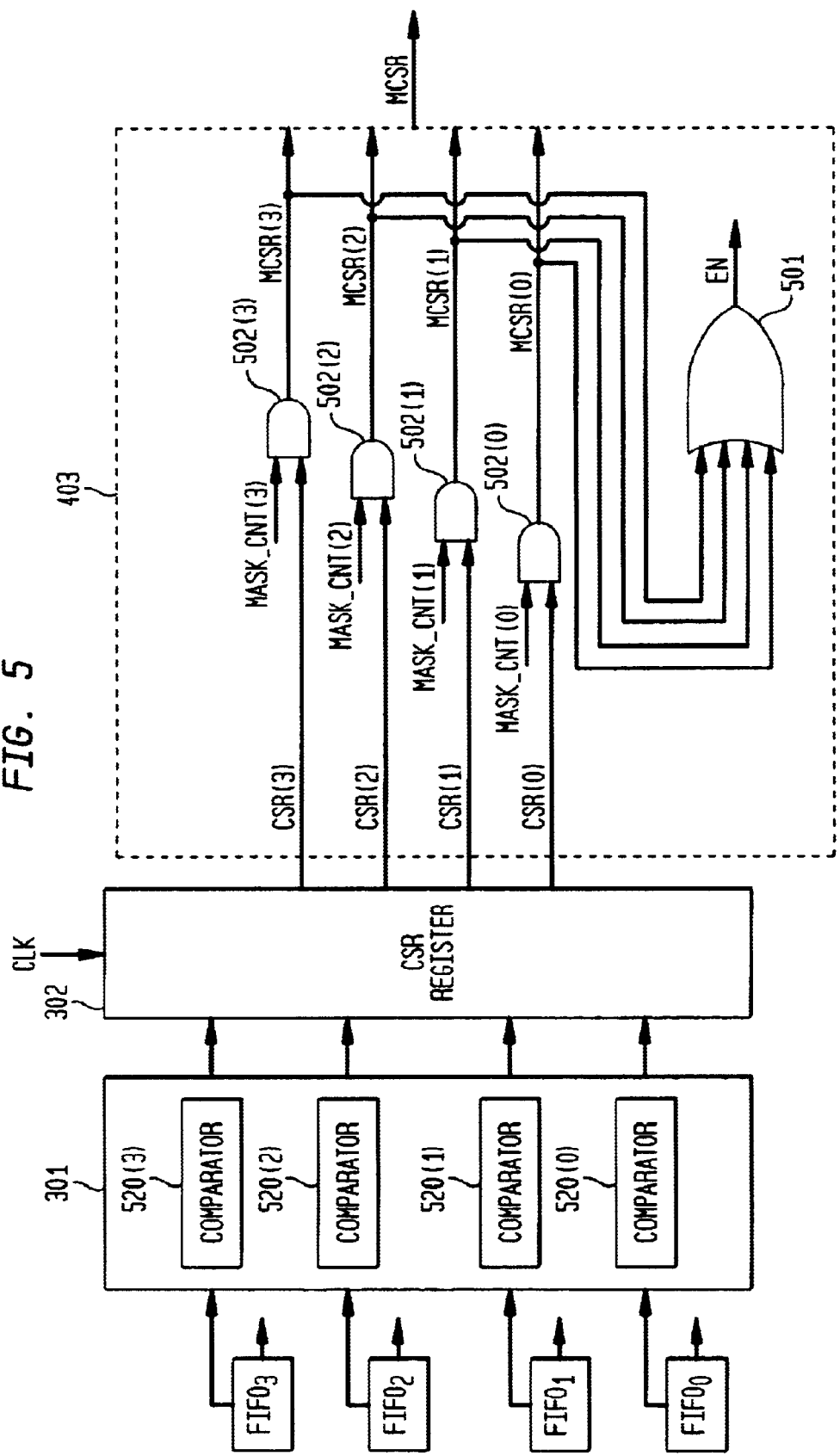
FIG. 5 shows an exemplary circuit implementation for the masked channel service logic shown in FIG. 4.

FIG. 5 shows an exemplary implementation of masked channel service logic 403 shown in FIG. 4. The CSR word for masked channel service logic 403 is generated as follows. Four buffers FIFO(0)–FIFO(3) are monitored with corresponding comparators 520(0)–520(3) of FIFO comparator logic 301 to detect whether the corresponding buffer is non-empty (the logical channel requests service). The output bit-values of the comparator logic 301 are latched in CSR register 302 as a four-bit CSR word with bits CSR(0)–CSR(3) associated with logical channels 0–3, respectively.

Masked channel service logic 403 includes AND gates 502(0)–502(3) and OR gate 501. Corresponding bits of the CSR word (CSR(0)–CSR(3)) and the mask Mask_Cnt (Mask_Cnt(0)–Mask_Cnt(3)) are combined in AND operations via a respective AND gates 502(0)–502(3). The AND operation of each of the AND gates 502(0)–502(3) generates a corresponding bit of the MCSR word (MCSR(0)–MSCR(3)). OR gate 501 generates the logical OR of bits MCSR(0)–MCSR(3) to generate the logic value for enable signal EN. When enable signal EN is set, at least one of the bits MCSR(0)–MCSR(3) is set, indicating that at least one logical channel of the current cycle requests service.

Figure 6:
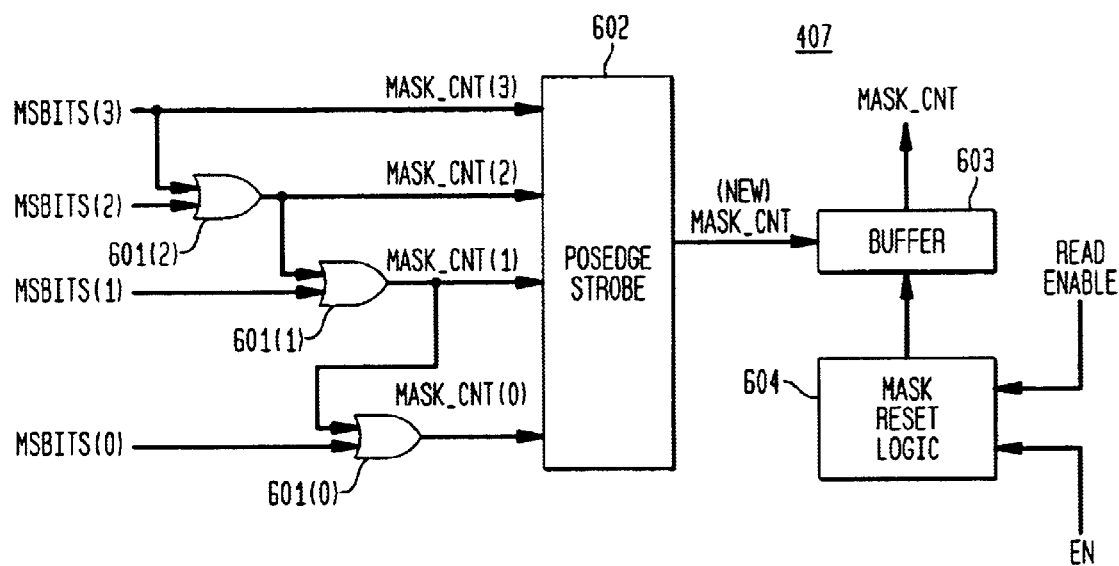
FIG. 6 shows an exemplary circuit implementation for the mask counter logic shown in FIG. 4.

FIG. 6 shows an exemplary implementation of mask counter logic 407 shown in FIG. 4. Mask counter logic 407 includes OR gates 601(0), 601(1), and 601(2), strobe 602, buffer 603, a logic 604. Buffer 603 stores the current mask value Mask_Cnt. Strobe 602 is employed to provide valid signals corresponding to logic values for MSBits(3) and for output values of OR gates 601(0), 601(1), and 601(2) prior to latching a new value of Mask_Cnt in buffer 603.

When the enable signal EN is not set, the bit values of MSBits correspond to the bit values of the current CSR word. In this case, mask count-down processing is not enabled and the current bit values of Mask Cut in buffer 603 are in a "don't care" state. When the enable signal EN is set to "0", the bits MSBits(0)–MSBits(3) are all reset (e.g., all set to "0") because all logical channel service requests of the current cycle are satisfied. In this case, READ ENABLE is employed by mask reset logic 604 to determine which of two cases is present. For the first case, READ ENABLE is not set, indicating that none of the bits of the CSR word are set (i.e., no new logical channel service requests were received for the next cycle), and so the current value for Mask_Cnt in buffer 603 is in a "don't care" state.

For the second case, at least one of the bits of the CSR word is set to 1, and so READ ENABLE is also set by OR gate 405 of FIG. 4. When READ ENABLE is set, mask reset logic 604 sets all bits of Mask_Cnt (i.e., Mask_Cnt(0)–Mask_Cnt(3) are all set to "1"). Since the bits of MSBits correspond to the bits of the current CSR word, two events occur, and the next cycle of the round-robin scheduling begins. The first event is that the MCSR word also now corresponds to the CSR word, and hence the enable signal EN is then set by MCS logic 403 of FIG. 4 to enable mask count-down processing of the next cycle. The second event is that the most significant bits of Mask_Cnt are reset to "0" for those bits of the CSR word that are not set.

When the enable signal EN transitions to being set for the second event, the bits MSBits(0)–MSBits(3) initially correspond to the bits CSR(0)–CSR(3) of the current CSR word. The MSB of Mask_Cnt is set to the MSB of MSBits. Each subsequent bit of Mask_Cnt (N−1), N=1, 2, 3 is set to the logical OR Mask_Cnt(N) and MSBits(N−1) by corresponding OR gate 601(N−1). In general, the first, most significant set bit of MSBits sets the most significant bit of Mask_Cnt, and the daisy-chained OR gates then set all subsequent bits of Mask_Cnt.

The operation of the exemplary embodiment is described for an exemplary sequence of CSR words generating mask values (Mask_Cnt), Masked CSR words, MSBits, and Channel IDs as given in Table 1. In Table 1, for each step, the listed bit values for Mask_Cnt are the current values at the beginning of the step that are applied to the corresponding bits CSR(0)–CSR(3) of the current CSR word.

TABLE 1

| Step | CSR Word | MCSR Word | MSBits | Channel ID | Mask_Cnt |
|------|----------|-----------|--------|------------|----------|
| A | 0000 | 0000 | 0000 | disabled | xxxx |
| B | 1000 | x000 | 1000 | 3 | xxxx |
| C | 1001 | 1001 | 1001 | 3 | 1111 |
| D | 1101 | 1101 | 1101 | 3 | 1111 |
| E | 0101 | 0101 | 0101 | 2 | 1111 |
| F | 0011 | 0011 | 0011 | 1 | 0111 |
| G | 0001 | 0001 | 0001 | 0 | 0011 |
| H | 1001 | 0001 | 0001 | 0 | 0001 |
| I | 1101 | 0001 | 0001 | 0 | 0001 |
| J | 1100 | 0000 | 1100 | 3 | xxxx |
| K | 1100 | 1100 | 1100 | 3 | 1111 |
| L | 0110 | 0110 | 0110 | 2 | 1111 |

At step A, all bits of the CSR word are 0, thus every bit of the MCSR word is 0, the channel ID value is not enabled since no logical service requests are pending (and so READ ENABLE is not set), and the Mask_Cnt is in a "don't care" state. At step B, the most significant bit the CSR word, corresponding to logical channel 3, is set, indicating that the logical channel's buffer FIFO(3) is non-empty and requires service (which begins as READ ENABLE is set). Initially, the CSR word is passed through mux 404 to Channel ID generator 406, which identifies the logical channel with the highest number requesting service as logical channel 3. Mask_Cnt bit values are initially in the "don't care"state since the bit values of step B in Table 1 for Mask_Cnt are the bit values at the beginning of the step before mask counter logic 407 sets the new bit values in Mask_Cnt. However, when any bit of the CSR word is set, the signals EN and READ ENABLE are both set and mask counter logic 407 rolls-over Mask_Cnt to an all bits set state for step C.

The mask count-down process begins at step C, and the bit CSR(0) of Table 1 is set, indicating another logical channel service request is received for logical channel 0. With the LSB of the CSR word set, the bits of Mask_Cnt are each set, the enable signal EN is set, and the bits of the MSCR word (and hence, MSBits) are then set to the bit values of the CSR word. At step D, another logical channel service request is received for logical channel 2, and thus the corresponding bit of the CSR word is set. Service for the logical channel 3 is not yet complete (since the corresponding bit of the CSR word has not yet been reset). Therefore, the bit values of Mask_Cnt remain unchanged.

The mask count-down process continues to step E, where service for logical channel 3 completes and the corresponding bit CSR(3) of the CSR word is reset. Since the highest numbered logical channel requesting service is logical channel 2, Channel ID identifies logical channel 2 for service. The bit of Mask_Cnt corresponding to logical channel 3 is still set. However, at the end of step E, the bit CSR(3) for logical channel 3 of the CSR word (and hence, of the MCSR word) that is reset subsequently resets the corresponding bit of Mask_Cnt.

As illustrated by the transitions between steps F, G, and H, when the service of logical channel 1 completes between steps F and G, the bit value MCSR(1) of the MCSR word corresponding to logic channel 1 (and hence MSBits(1)) is reset. Consequently, when step G completes, OR gate 601(1) of FIG. 6 provides the logic OR operation of MSBits(1) with Mask_Cnt(2) (currently set as a logic "0"). This logic combination of MSBits(1) with Mask_Cnt(2) resets Mask_Cnt(1) (to logic "0") for step H.

The mask count-down process continues to step H1, where the most significant bit CSR(3) of the CSR word corresponding to logical channel 3 is set, indicating that the buffer FIFO(3) for logical channel 3 is non-empty and requires service. However, since the bit of Mask_Cnt corresponding to channel 3 is not set, the corresponding bit of the MCSR word (and hence MSBits(0) of MSBits) for channel 3 is also not set because it is masked (via AND gate 502(3) of FIG. 5). Consequently, the logical channel 0 remains the highest numbered logical channel provided as the Channel ID.

The mask count-down process continues through step I to step J, where service of the logical channel 0 buffer FIFO(0) completes and the corresponding bit CSR(0) of the CSR word is reset. At step J, all bits of the MSCR word are now reset to zero when Mask_Cnt is combined with the CSR word because i) only the least significant bit of Mask_Cnt is set and ii) the least significant bit of MCSR (and hence of the MSBits) is reset to 0 when the service of logical channel 0 buffer FIFO(0) is complete. Consequently, the enable signal EN is reset, and mux 404 now passes the CSR word through as MSBits. However, logical channel service requests for logical channels 3 and 2, which arrived during the previous cycle at steps H and 1, are present and the corresponding bits CSR(3) and CSR(2) of the CSR word are set. Therefore, OR gate 405 FIG. 4 maintains the READ ENABLE signal as set. At step J, the bits of MSBits are the bits of the CSR word from mux 404, and the bits of Mask_Cnt are initially in a "don't care" state. After step J completes mask reset logic 604 FIG. 6 sets all bits of Mask_Cnt to 1 for step K, which applies this mask to the CSR word to generate the MCSR word. Since the MCSR word of step K has at least one bit that is set (the two most significant bits for channels 3 and 2), the EN signal is also set and mux 404 passes this MCSR word as MSBits, beginning the mask count-down process of the next cycle.

The present invention may provide for the following advantages. Since the sequence of buffers for service is separately generated based on whether a buffer is non-empty, a buffer server need not examine each buffer to determine whether the buffer requires service. Consequently, one or more processor cycles may be saved, increasing speed and efficiency of the round-robin scheduling for implementations of the present invention.

While the exemplary embodiments of the present invention have been described with respect to circuits and systems, the present invention is not so limited. As would be apparent to one skilled in the art, various functions may be implemented in the digital domain as processing steps in a software program, by digital logic, or in combination of both software and hardware. Such software may be employed in, for example, a digital signal processor, micro-controller or general-purpose computer. Such hardware and software may be embodied within circuits implemented in an integrated circuit.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for routing data from an input frame to an output frame, comprising:

a plurality of buffers, each buffer associated with a logical channel and receiving data for the corresponding logical channel in the input frame, wherein, when the one or more of the plurality of buffers are serviced, the data from the one or more buffers is transferred in accordance with a logical channel order for inclusion in the output frame;

channel service logic generating a channel service request (CSR) word from the plurality of buffers, each bit of the CSR word associated with a channel to identify each corresponding non-empty buffer; and a scheduler 1) generating a mask corresponding to a token for round-robin scheduling; 2) generating the logical channel order from the channel service data in accordance with the round-robin scheduling; and 3) updating the logical channel order and mask during a cycle, wherein the scheduler generates the logical channel order to select channels with non-empty buffers for service during each cycle of round-robin scheduling, and updates the mask to maintain the token and wherein the scheduler comprises:

channel identification (ID) generator providing a sequence of logical channel IDs as the logical channel order for the cycle based on each output word MSBits; and mask logic (1) combining the mask with the CSR word to generate a masked CSR word, wherein the bits of the masked CSR word correspond to those logical channels for service during the cycle, and (2) setting an enable signal based on the bits of the masked CSR word, wherein the CSR word is provided as the output word MSBits if the enable signal is not set and the masked CSR word is provided as the output word MSBits if the enable signal is set;

wherein the channel identifier (ID) selects a logical channel ID of the sequence based on the output word MSBits.

2. The invention as recited in claim 1, wherein the scheduler further comprises:

mask counter logic updating the mask based on the output word MSBits, wherein the mask is reset when the enable signal is initially set.

3. The invention as recited in claim 2, further comprising a multiplexer (mux) selecting either the CSR word or the masked CSR word as an output word MSBits based on the enable signal.

4. The invention as recited in claim 2, the channel service logic comprises a plurality of comparators and a register, wherein each comparator is coupled to a buffer to generate a bit indicating whether the buffer is non-empty and the register receives each bit form the plurality of comparators to provide the CSR word.

5. The invention as recited in claim 2, wherein the mask logic includes a plurality of AND gates, and each corresponding pair of bits of the mask and CSR word are combined with an AND gate to generate a corresponding bit of the masked CSR word.

6. The invention as recited in claim 2, comprising an OR gate, wherein the enable signal is generated by the OR gate as the logic OR of each of the bits of the MCSR word.

7. The invention as recited in claim 1, wherein the mask logic includes a plurality of OR gates, and wherein 1) the most significant bit of the mask corresponds to the most significant bit of the output word MSBits, and each subsequent significant bit of the mask is generated by a corresponding OR gate that combines the corresponding bit of MSBits with the previously generated bit of the mask.

8. The invention as recited in claim 1, wherein, for the cycle, the round-robin scheduling either includes or excludes newly arrived, lower numbered logical channels needing service in the logical channel order for the current cycle.

9. The invention as recited in claim 1, wherein the apparatus is a circuit embodied in an integrated circuit.

10. The invention as recited in claim 1, wherein the apparatus is implemented as a priority encoder in a terminal of a telecommunications network.

11. A method of routing data from an input frame to an output frame, the method comprising the steps of:

(a) receiving data for a logical channel in the input frame into a corresponding one of a plurality of buffers, each buffer associated with a logical channel;

(b) transferring, when the one or more of the plurality of buffers are serviced, the data from the one or more buffers in accordance with a logical channel order for inclusion in the output frame;

(c) generating a channel service request (CSR) word from the plurality of buffers, each bit of the CSR word associated with a channel to identify each corresponding non-empty buffer; and (d) scheduling service of the logical channels by the steps of (d1) generating a mask corresponding to a token for round-robin scheduling;

(d2) generating the logical channel order from the channel service data in accordance with the round-robin scheduling to select channels with non-empty buffers for service during each cycle of round-robin scheduling wherein step (d2) comprises the steps of:

(i) providing a sequence of logical channel IDs as the logical channel order for the cycle based on each output word MSBits; and (ii) combining the mask with the CSR word to generate a masked CSR word, wherein the bits of the masked CSR word correspond to those logical channels for service during the cycle, and (iii) setting an enable signal based on the bits of the masked CSR word, (iv) providing the CSR word as the output word MSBits if the enable signal is not set and the masked CSR word as the output word MSBits if the enable signal is set; and (v) selecting a logical channel ID of the sequence based on the output word MSBits, and (d3) updating the logical channel order and mask during a cycle to maintain the token.

12. The invention as recited in claim 11, wherein step (d3) comprises the step of updating the mask based on the output word MSBits, wherein the mask is reset when the enable signal is initially set.

13. The invention as recited in claim 11, wherein the method is implemented by at least one processor embodied in an integrated circuit.

14. A computer-readable medium having stored thereon a plurality of instructions, the plurality of instructions including instructions which, when executed by a processor, cause the processor to implement a method for routing data from an input frame to an output frame, the method comprising the steps of:

(a) receiving data for a logical channel in the input frame into a corresponding one of a plurality of buffers, each buffer associated with a logical channel;

(b) transferring, when the one or more of the plurality of buffers are serviced, the data from the one or more buffers in accordance with a logical channel order for inclusion in the output frame;

(c) generating a channel service request (CSR) word from the plurality of buffers, each bit of the CSR word associated with a channel to identify each corresponding non-empty buffer; and (d) scheduling service of the logical channels by the steps of (d1) generating a mask corresponding to a token for round-robin scheduling;

(d2) generating the logical channel order from the channel service data in accordance with the round-robin scheduling to select channels with non-empty buffers for service during each cycle of round-robin scheduling, wherein step (d2) comprises the steps of:

(i) providing a sequence of logical channel IDs as the logical channel order for the cycle based on each output word MSBits; and (ii) combining the mask with the CSR word to generate a masked CSR word, wherein the bits of the masked CSR word correspond to those logical channels for service during the cycle, and (iii) setting an enable signal based on the bits of the masked CSR word, (iv) providing the CSR word as the output word MSBits if the enable signal is not set and the masked CSR word as the output word MSBits if the enable signal is set; and (v) selecting a logical channel ID of the sequence based on the output word MSBits; and (d3) updating the logical channel order and mask during a cycle to maintain the token.

* * * * *